United States Patent
Nylund

(10) Patent No.: US 6,236,701 B1
(45) Date of Patent: May 22, 2001

(54) FUEL ASSEMBLY FOR A NUCLEAR REACTOR

(75) Inventor: Olov Nylund, Västerås (SE)

(73) Assignee: ABB Atom AB, Vasteras (SE)

( * ) Notice: Subject to any disclaimer, the term of this patent is extended or adjusted under 35 U.S.C. 154(b) by 0 days.

(21) Appl. No.: 09/319,532

(22) PCT Filed: Dec. 3, 1997

(86) PCT No.: PCT/SE97/02020

§ 371 Date: Jul. 21, 1999

§ 102(e) Date: Jul. 21, 1999

(87) PCT Pub. No.: WO98/28753

PCT Pub. Date: Jul. 2, 1998

(30) Foreign Application Priority Data

Dec. 20, 1996 (SE) .................................................. 9604720

(51) Int. Cl.[7] .................................................. G21B 3/32
(52) U.S. Cl. .................. 376/443; 376/444; 376/453; 376/454
(58) Field of Search ............................. 376/434, 443, 376/444, 435, 453, 447

(56) References Cited

U.S. PATENT DOCUMENTS

| | | | |
|---|---|---|---|
| 3,212,982 | * 10/1965 | Astlet et al. ................ | 376/347 |
| 4,585,614 | * 4/1986 | Helmersson ................ | 376/434 |
| 5,091,146 | 2/1992 | Dix ........................... | 376/443 |
| 5,345,487 | * 9/1994 | Johansson ................... | 376/444 |
| 5,483,565 | * 1/1996 | Gronlund et al. ............ | 376/352 |
| 5,778,035 | * 7/1998 | Nylund ....................... | 376/361 |
| 5,787,140 | * 7/1998 | Dunlap et al. ............... | 376/313 |

FOREIGN PATENT DOCUMENTS

| | | |
|---|---|---|
| 0 555 081 A1 | 8/1993 | (EP) . |
| 0 605 816 A2 | 7/1994 | (EP) . |
| 2603416 | * 3/1988 | (FR) . |
| 873552 | 7/1961 | (GB) . |
| 54-000191 | * 1/1979 | (JP) . |
| WO 96/20483 | 7/1996 | (WO) . |

\* cited by examiner

Primary Examiner—Michael J. Carone
Assistant Examiner—Kyongtack K. Mun
(74) Attorney, Agent, or Firm—Connolly Bove Lodge & Hutz, LLP

(57) ABSTRACT

A fuel assembly for a boiling water reactor comprising at least one rotary cell (13a–13d) which has fuel rods (4) arranged in a number of concentric rings with a substantially circular shape, and a steam conducting channel (17a–17d) arranged in the centre of the concentric rings through which steam flows upwards through the fuel assembly. At least certain of the fuel rods in the rings are arranged such that their upper ends are displaced in relation to their lower ends in the tangential direction such that water and steam are brought to rotate around the steam conducting channel.

12 Claims, 11 Drawing Sheets

B-B

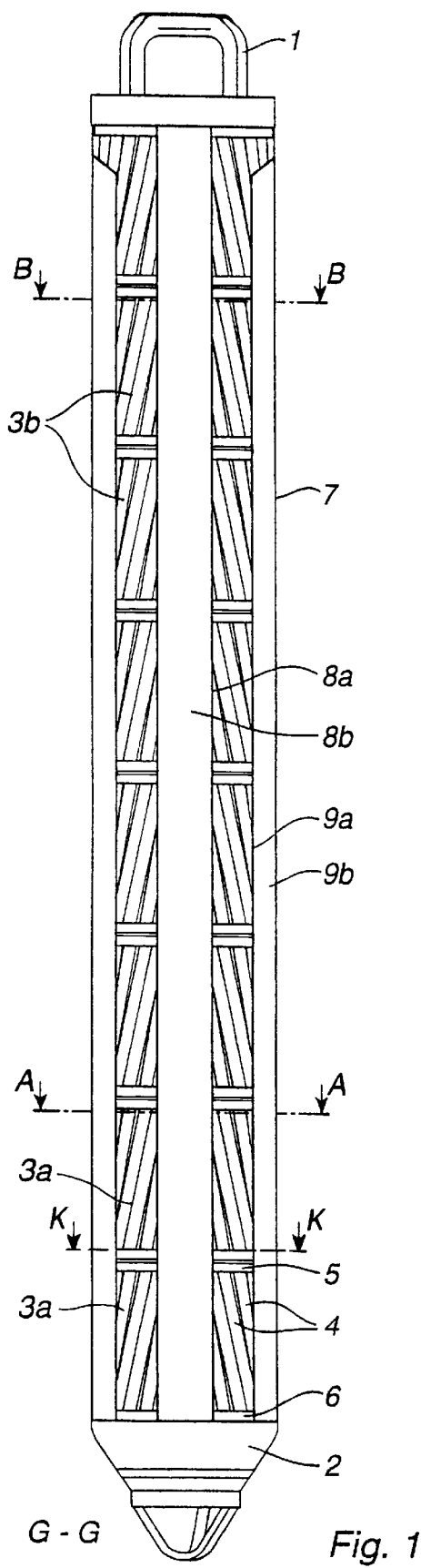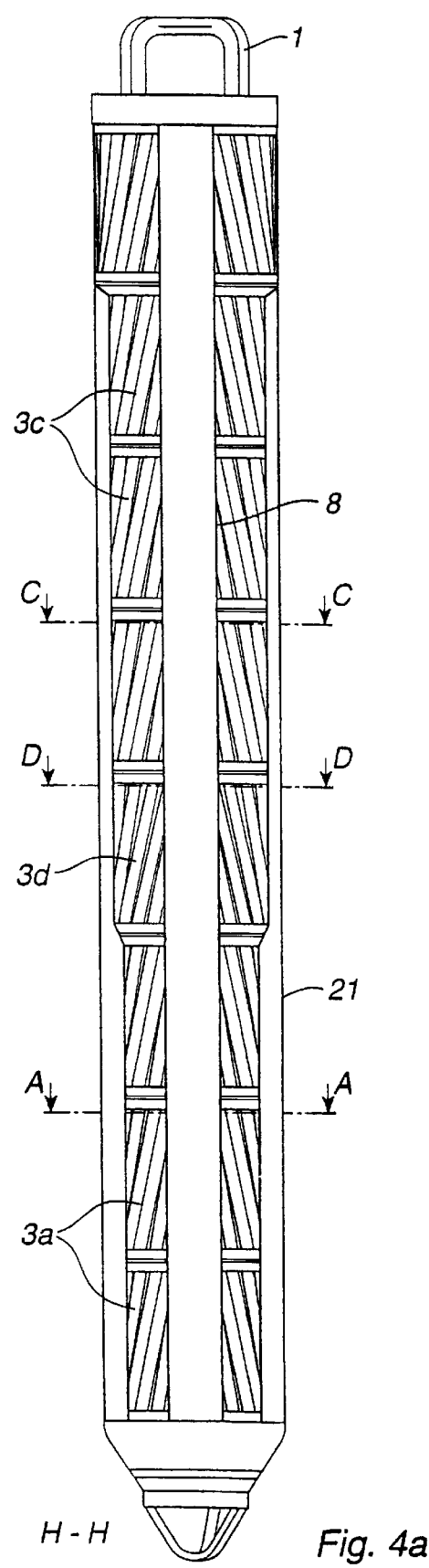
G - G  Fig. 1
H - H  Fig. 4a

A - A

A - A 9c

D - D

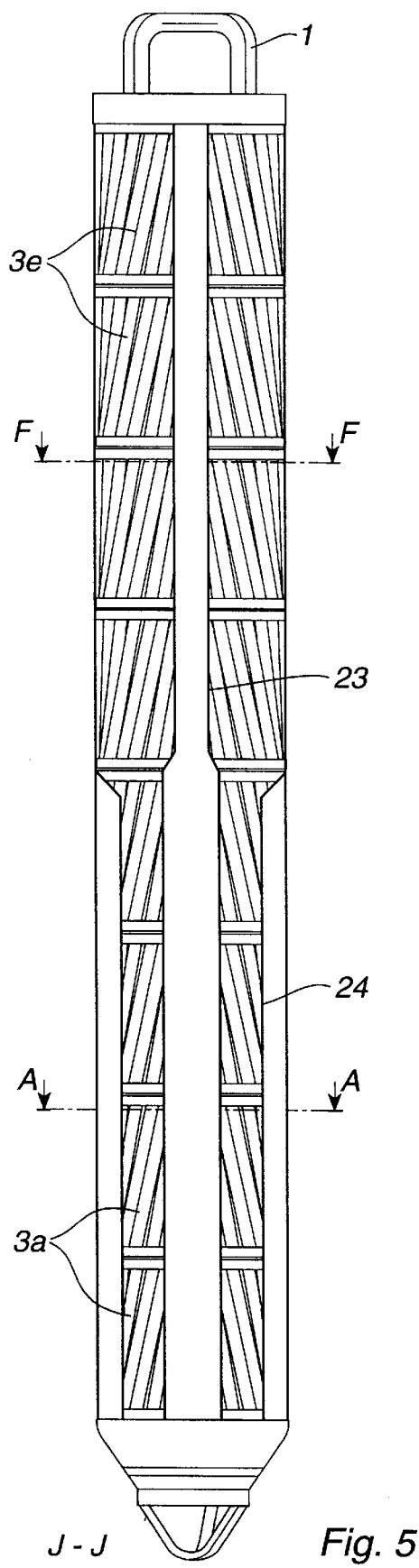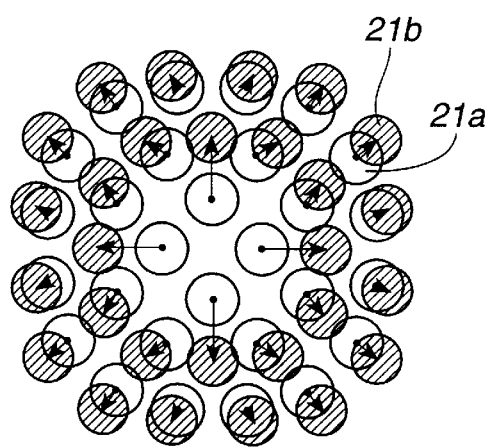
Fig. 5a
J - J   Fig. 5

F-F

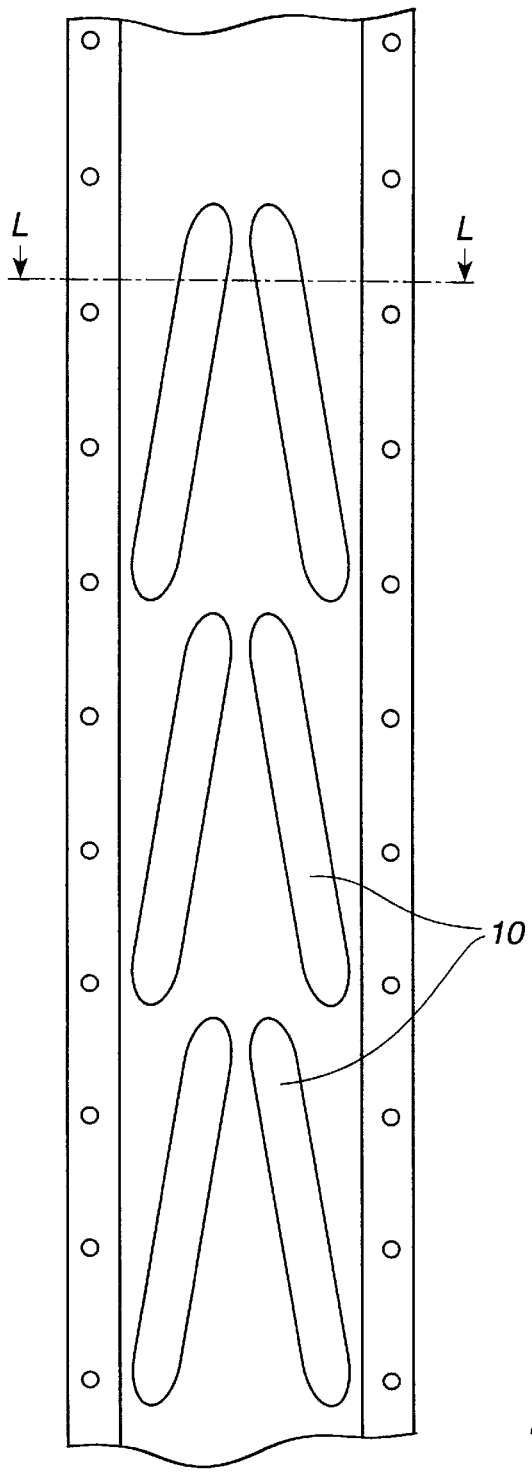
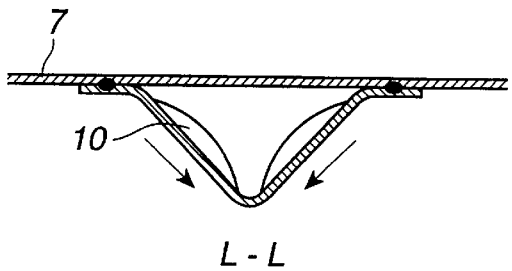
Fig. 7b
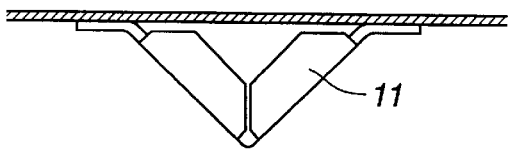
Fig. 7c
Fig. 7a

FUEL ASSEMBLY FOR A NUCLEAR REACTOR

TECHNICAL FIELD

The present invention relates to a fuel assembly for a boiling water reactor which is adapted, during operation of the reactor, to allow cooling water to flow upwards through the fuel assembly while absorbing heat from a plurality of fuel rods which are surrounded by a fuel channel, whereby part of the cooling water is transformed into steam, and where the fuel assembly comprises a steam conducting channel through which the steam is allowed to flow through the fuel assembly towards the outlet end thereof.

BACKGROUND ART

In a boiling water nuclear reactor, moderated by light water, the fuel exists in the form of fuel rods arranged in a certain, normally symmetrical pattern, a so-called lattice, and is retained at the top by a top tie plate and at the bottom by a bottom tie plate. A fuel assembly comprises one or more bundles of fuel rods which are surrounded by a fuel channel with a substantially square cross section. In the core of the reactor, the fuel assemblies are arranged vertically and spaced from each other. During operation, the water is admitted through the bottom of the fuel assembly and then flows upwards through the fuel assembly past the fuel rods. The heat emitted by the fuel rods is taken up by the water which starts boiling, whereby part of the water is transformed into steam. The water and the steam are passed out through the upper end of the fuel assembly. The produced steam is delivered to turbines which drive generators where electrical energy is generated.

A disadvantage with a boiling reactor is the high proportion of steam by volume in the upper part of the fuel assembly.

When the proportion of steam by volume rises in the coolant, its ability to carry off heat from the fuel rods is reduced, thus increasing the risk of dryout, which in turn leads to an increase of the risk of fuel damage.

Still another problem with a high steam volume in the fuel is that steam is inferior to water as moderator, which results in the moderation being insufficient whereby the fuel is utilized inefficiently. In the lower part of the fuel assembly, the moderator consists of water whereas the moderator in the upper part of the fuel assembly consists of both steam and water. This means that the fuel in the upper part of the fuel assembly cannot be utilized efficiently. It is, therefore, desirable to keep down the steam volume in the coolant while at the same time maintaining the steam generation at a high level.

The faster the steam disappears out from the fuel assembly, the lower the steam volume. A separation of the steam flow and the water flow in the upper part of the fuel assembly thus gives the steam flow a higher velocity than the water flow, whereby the proportion of steam by volume in the fuel assembly is reduced. In this way, the margin with respect to dryout is improved and the fuel in the upper part of the fuel assembly is utilized in a better way.

U.S. Pat. No. 5,091,146 discloses a fuel assembly which attempts to achieve a separation of the steam flow and the water flow in the upper part of the fuel assembly by arranging a steam pipe above one or more part-length fuel rods, that is, fuel rods extending from the bottom tie plate but terminating below and at a distance from the top tie plate. In this way, the steam which is generated in the coolant is to be diverted. The pipe has openings both in its upper and its lower end. The disadvantages of such a pipe are several. For one thing, it may be expensive to manufacture, and, for another, it gives an increased pressure drop in the upper part of the fuel assembly. Another disadvantage is that it may be difficult to cause the continuously produced steam to enter the pipe. Admittedly, the pipe is provided with openings and other devices to cause the steam to flow into the pipe and to prevent water from entering the pipe, but it is still doubtful whether this is an effective way of causing the steam to enter the tube.

SUMMARY OF THE INVENTION

The object of the invention is to provide a fuel assembly which in a simple and efficient way separates the steam flow and the water flow at least partially, thus obtaining a lower proportion of steam by volume in the fuel assembly.

What characterizes a fuel assembly according to the invention will become clear from the appended claims.

A fuel assembly according to the invention comprises a vertical channel which conducts steam upwards through the fuel assembly during operation of the reactor. This channel has no walls but only comprises an empty volume between the fuel rods and will hereinafter be referred to as a steam conducting channel. The fuel assembly is designed such that the coolant, that is, water and steam, is caused to rotate around the steam conducting channel so as to form an upward eddy. The eddy rotates so fast that the steam separates from the water with the aid of the centrifugal force. The water, which is heavier than the steam, is thrown outwards and away from the steam conducting channel, whereas the lighter steam is pressed against the centre of the eddy and hence against the steam conducting channel. This gives the steam a considerably higher speed than the natural speed and the steam is able to leave the fuel assembly, at a high speed, via the steam conducting channel. In this way, the proportion of steam by volume in the fuel assembly is reduced.

To achieve a rotation of water and steam around the steam conducting channel, this channel is surrounded by fuel rods arranged in concentric rings with a substantially circular shape. The steam conducting channel is arranged in the centre of these rings. The fuel rods in the rings are arranged such that their upper ends are displaced in a tangential direction in relation to their lower ends, so as to form a helix. In this way, the coolant is forced to rotate around the steam conducting channel while at the same time moving upwards through the fuel assembly.

BRIEF DESCRIPTION OF THE DRAWINGS

FIG. 1 schematically shows a vertical section G—G through a first embodiment of a fuel assembly according to the invention.

FIG. 4a schematically shows a vertical section H—H through a second embodiment of a fuel assembly according to the invention.

FIGS. 4b–4c show two horizontal sections C—C and D—D through the fuel assembly in FIG. 4a.

FIG. 5 schematically shows a vertical section J—J through a third embodiment of a fuel assembly according to the invention.

FIG. 5a shows for the fuel assembly in FIG. 5 how the lattice in an upper fuel unit is displaced outwards in relation to the lattice in a lower fuel unit.

FIGS. 7a–7c show a guide bar.

DESCRIPTION OF THE PREFERRED EMBODIMENTS

To be able to design the fuel assembly such that water and steam are separated in an efficient way, it is desirable that the fuel assembly is so flexible that it may be given different shapes in the axial and radial directions in a simple way. Such a fuel assembly is shown in PCT/SE95/01478. This fuel assembly comprises a plurality of fuel units stacked on top of each other, each of which contains a plurality of fuel rods extending between a top tie plate and a bottom tie plate. The fuel units are surrounded by a common fuel channel of substantially square cross section. A fuel assembly of this type may, in a simple manner, be given axially and radially different shapes.

Swedish patent application No. 9602447-6, which is still unpublished at the time of filing of the present application, shows a fuel assembly which has a steam conducting channel in the form of an empty volume extending through part of the fuel assembly, and which is surrounded by fuel rods arranged in concentric rings with a substantially square shape. The fuel rods are arranged in an orthogonal lattice where each fuel rod is included in two rows perpendicular to each other. The fuel rods in the rings are arranged such that the upper attachment point is displaced in relation to the lower attachment point in a tangential direction, such that water and steam are caused to rotate around the steam conducting channel. The fuel assembly comprises a plurality of fuel units stacked on top of each other, each of which contains a plurality of fuel rods extending between a top tie plate and a bottom tie plate. One disadvantage of this fuel assembly is that it is difficult to obtain sufficient rotation of the water such that water and steam are separated. Another disadvantage is that it is difficult to incline the fuel rods in the corners of the square rings without the fuel rods being brought into contact with each other.

To solve the above-mentioned problems, this application suggests a fuel assembly in which the fuel rods are instead arranged in a polar lattice, that is, fuel rods are arranged as substantially circular and concentric rings, and the steam conducting channel is arranged in a centre of these rings. This gives a lattice which has a symmetry corresponding to the desired rotation. Fuel rods within the same ring have largely the same distance to the centre of the steam conducting channel. A steam conducting channel surrounded by fuel rods arranged in concentric rings with a substantially circular shape will hereinafter be referred to as a rotary cell. A fuel assembly according to the invention has four quadrants, each of which comprises one rotary cell. To further guide the flow around the steam conducting channel, each rotary cell is at least partially surrounded by a flow-guiding structure.

Figure 2A:
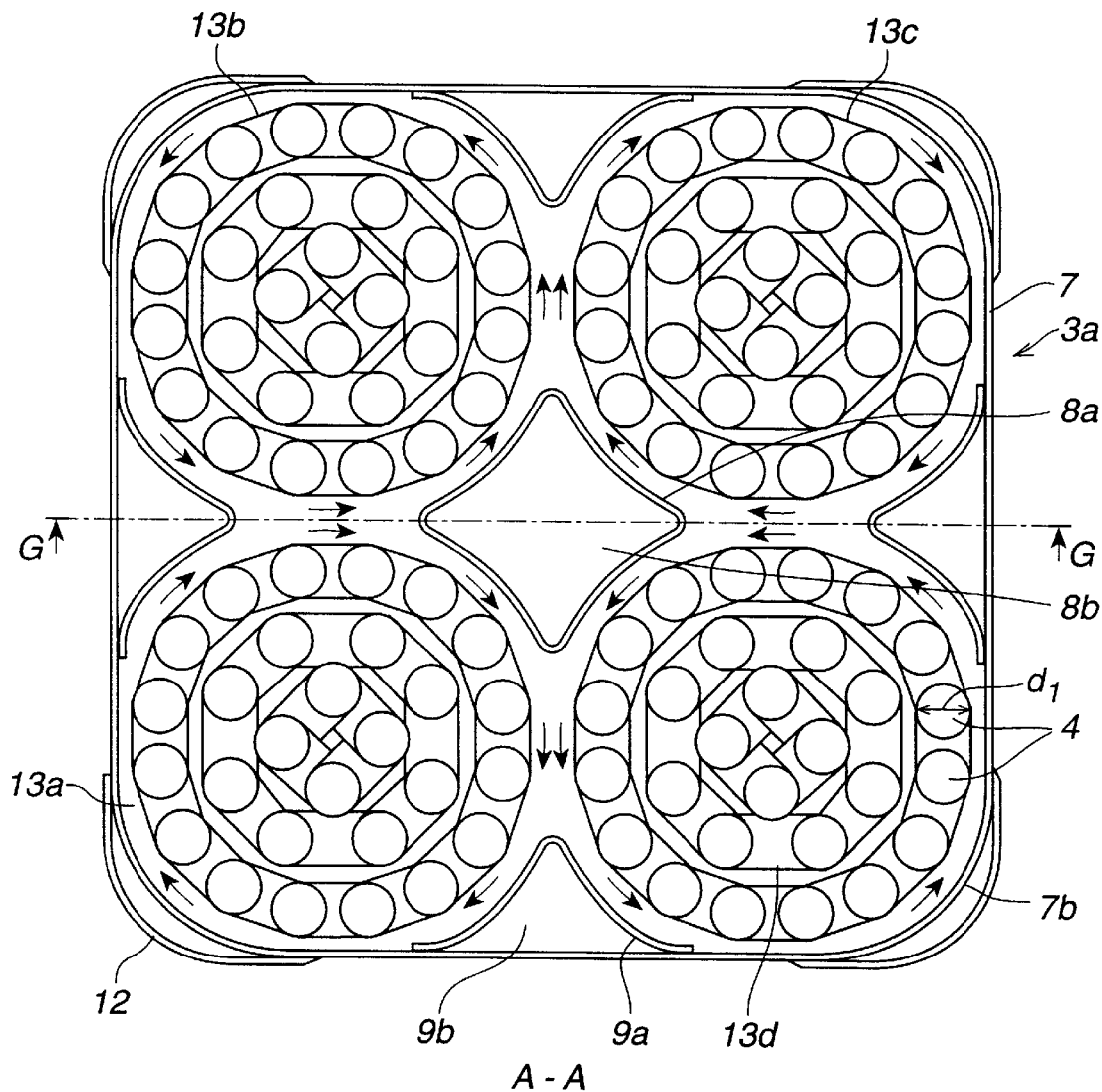
FIG. 2a shows a horizontal section A—A through the lower part of the fuel assembly in FIG. 1.
Figure 2B:
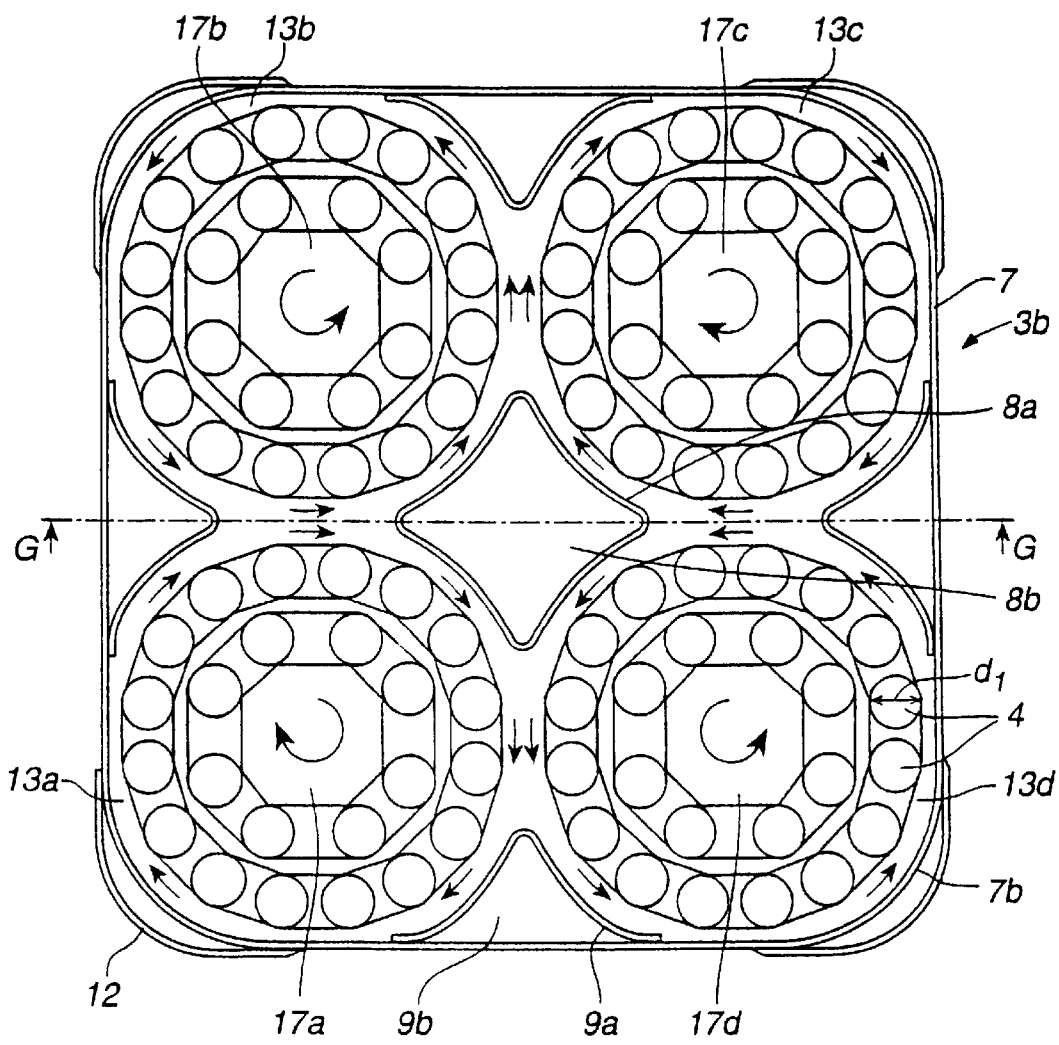
FIG. 2b shows a horizontal section B—B through the upper part of the fuel assembly in FIG. 1.

FIGS. 1, 2a and 2b show a fuel assembly according to the invention. During operation, the fuel assembly is arranged vertically in the reactor core. FIG. 1 shows a vertical section G—G through the fuel assembly. FIG. 2a shows a horizontal section A—A through the lower part of the fuel assembly and FIG. 2b shows a horizontal section through the upper part of the fuel assembly. The fuel assembly comprises an upper handle 1, a lower end portion 2 and a plurality of fuel units 3a and 3b, stacked on top of each other. Each fuel unit comprises a plurality of fuel rods 4 arranged between the a top tie plate 5 and a bottom tie plate 6. The fuel units a re stacked on top of each other in the longitudinal direction of the fuel assembly and they are stacked in such a way that the top tie plate 5 in one fuel unit is facing the bottom tie plate 6 in the next fuel unit in the stack. A fuel rod 4 comprises fuel in the form of a stack of uranium pellets arranged in a cladding tube. The fuel assembly is enclosed in a fuel channel 7 of substantally square c ross section. In this embodiment, the fuel assembly comprises eight fuel units, each having a height of 0.5 m.

The fuel units are suspended from and may be lifted with a centre tube 8a which is arranged centrally in the fuel assembly. The centre tube surrounds a flow channel 8b in which non-boiling water flows through the fuel assembly to improve the moderation in its central parts. The centre tube also con stitutes part of the flow-guiding structure which surrounds each rotary cell and is designed such that its walls guide the coolant flow so as to become deflected around the rotary cells. The centre tube in FIGS. 2a and 2b substantially have a square shape with concave walls.

In the longitudinal direction of the fuel assembly there are four V-shaped guide bars 9a which are attached to the fuel channel 7. The guide bars are arranged between the rotary cells and have two functions. For one thing, they constitute a stiffening of the fuel channel which in this way may be made with relatively thin walls, and, for another, they constitute part of the flow-guiding structure. The guide bars in FIGS. 2a and 2b have concave walls which conduct the coolant flow in the rotation around the steam conducting channels. In this embodiment, the guide bars extend through largely the whole fuel assembly and have a substantially constant cross-section area. The guide bars 9a form, together with the fuel channel 7, four bypass channels 9b which conduct water along the walls of the fuel channel. It may be advantageous to allow a certain amount of steam formation in the bypass channels for spectral shift effect.

FIG. 7a shows in more detail a possible embodiment of a guide bar. The guide bar is provided with elongated, oblique indentations 10 which contribute to the flow rotation and, in addition, give a mechanical stiffening. Alternatively, flow-guiding bulges may be made. The portions of the guide bar which support the top tie plates and the bottom tie plates at the joints between the fuel units have no indentations. The guide bar is attached to the fuel channel by means of spot welds. FIG. 7b shows a section L—L through the guide bar in FIG. 7a. FIG. 7c shows a folded-in portion 11 in the upper end of the guide bar for guiding the fuel units. The corners 7b of the fuel channel are rounded and constitute part of the flow-guiding structure. Welded corner bars 12 provide additional reinforcement of the fuel channel and may, in addition, serve as a support adapted to any detector probes between the fuel assemblies in the core.

FIG. 2a shows a fuel unit comprising four rotary cells 13a, 13b, 13c, 13d. In the figures, the direction of rotation of the coolant flow in the rotary cells are marked with arrows. In two of the rotary cells, 13b, 13d, the coolant flow rotates in an anticlockwise direction and in the other, 13a, 13c, the coolant flow rotates in a clockwise direction. The rotary cells each have 28 fuel rod positions arranged in a polar lattice. A fuel rod position is a position in the lattice where it is possible to arrange a fuel rod, but all the positions in the lattice need not be occupied by fuel rods. The polar lattice comprises three circular concentric rings. The inner ring has four positions, the middle ring has eight positions, and the outer ring has 16 positions. A fuel rod in a fuel unit has its lower end arranged in a first fuel rod position in the bottom tie plate and its upper end arranged in a second fuel rod position in the top tie plate. By arranging the upper and lower ends of the fuel rod in separate fuel rod positions, the fuel rods may be inclined.

Figure 3:
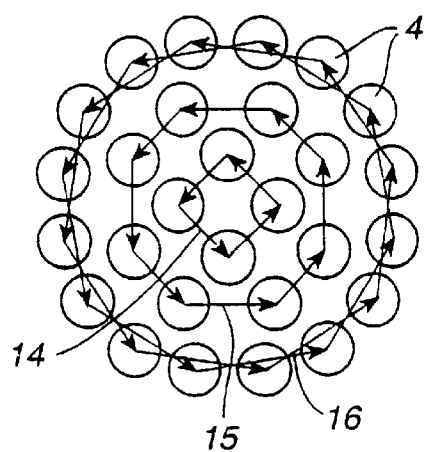
FIG. 3 shows how the fuel rods in a rotary cell are arranged inclined in a tangential direction.

FIG. 3 shows how the upper end of the fuel rods is displaced one or two steps in the lattice in relation to the lower end of the fuel rods. The displacement takes place within the same ring such that the fuel rods will incline in the direction of tangent of the ring. In the inner ring 14 and the middle ring 15, the fuel rods are displaced one step, and in the outer ring 16, the fuel rods are displaced two steps. All the fuel rods in a rotary cell are inclined in the same direction, that is, either clockwise or anticlockwise around the centre of the rotary cell. The purpose of inclining the fuel rods around the centre of the rotary cell is to put the coolant into rotation, that is, the water and the steam which flow upwards through the fuel assembly, thus achieving an eddy with a centre at the centre of the rotary cell. The eddy may be directed clockwise or anticlockwise, depending on in which direction the fuel rods in the two rings are inclined.

The polar lattice gives optimum conditions for inclined rods as a means of achieving or supporting the flow rotation. The patterns of inclination become simple and refined. Problems with rods getting too close to each other during the inclination are avoided. The lattice is in this example completely rotationally symmetrical.

Figure 2C:
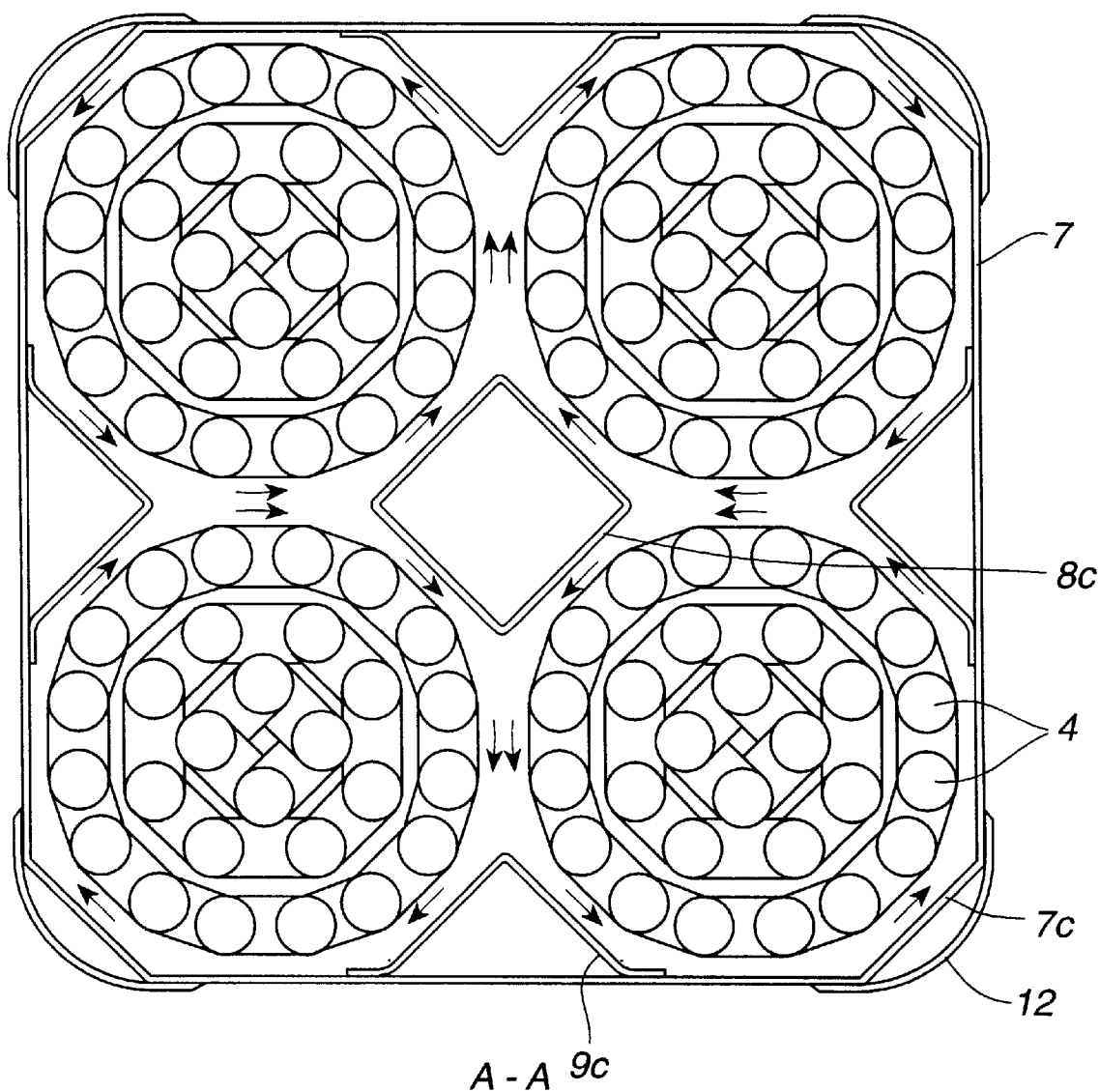
FIG. 2c shows an alternative embodiment of the lower part of the fuel assembly in FIG. 1.

FIG. 2c shows an example of an approximately octagonal lattice geometry. The flow-guiding structure is adapted to the octagonal geometry. The centre tube 8c is square with straight walls, the V-shaped guide bars 9c also have straight walls, and the corners 7c of the fuel channel are cut off straight. An advantage of this embodiment compared with the previously described one is that it is simpler and hence less expensive to manufacture.

The steam separation assumes that a volume is opened up around the rotary centre of the eddy in the upper part of the fuel assembly. In this embodiment, the open volume is achieved by excluding one or more fuel rods in the inner ring in the upper fuel units. The fuel units in the upper and lower parts of the fuel assembly have the same lattice but the number of occupied fuel rod positions is different.

The fuel assembly comprises two different types of fuel units, of which one type 3a is intended to be arranged in the lower part of the fuel assembly and the other type 3b is intended to be arranged in the upper part of the fuel assembly. FIG. 2a shows a horizontal section A—A through a fuel unit 3a in the lower part of the fuel assembly. In the fuel unit 3a, all the fuel rod positions in the lattice are occupied by fuel rods. FIG. 2b shows a horizontal section B—B through a fuel unit 3b in the upper part of the fuel assembly. The fuel unit 3b comprises four rotary cells, each having 24 fuel rods arranged in two rings with respectively 8 and 16 fuel rods each in each ring. Four fuel rod positions in the centre of the rotary cell are unoccupied. In this way, an empty volume is formed in the centre of the rotary cell. Otherwise, the fuel unit 3b is arranged in the same way as the fuel unit 3a and the fuel rods in the upper 3b and lower 3a fuel units have the same diameter $d_1$. The empty volume constitutes a vertical steam conducting channel which extends through the five uppermost fuel units in the fuel assembly. In the three lowermost fuel units 3a, no steam conducting channel is needed since there is not too much steam there. On the other hand, it is an advantage to initiate the eddy formation as early as possible.

There are four steam conducting channels 17a, 17b, 17c, 17d in the fuel assembly, one in each rotary cell. The inclined fuel rods in the rotary cell brings about an eddy of water and steam around the steam conducting channel. The direction of the eddies are marked by arrows in the steam conducting channel. In this eddy, the water and the steam are separated from each other by the water being thrown outwards and hence away from the steam conducting channel whereas the steam is pressed against the centre of the eddy. Because of the low density of the steam and the low flow resistance in the steam conducting channel, the steam will flow upwards through the steam conducting channel at great speed and disappear out through the top of the fuel assembly. In this way, the proportion of steam by volume in the coolant is reduced.

Figure 8A:
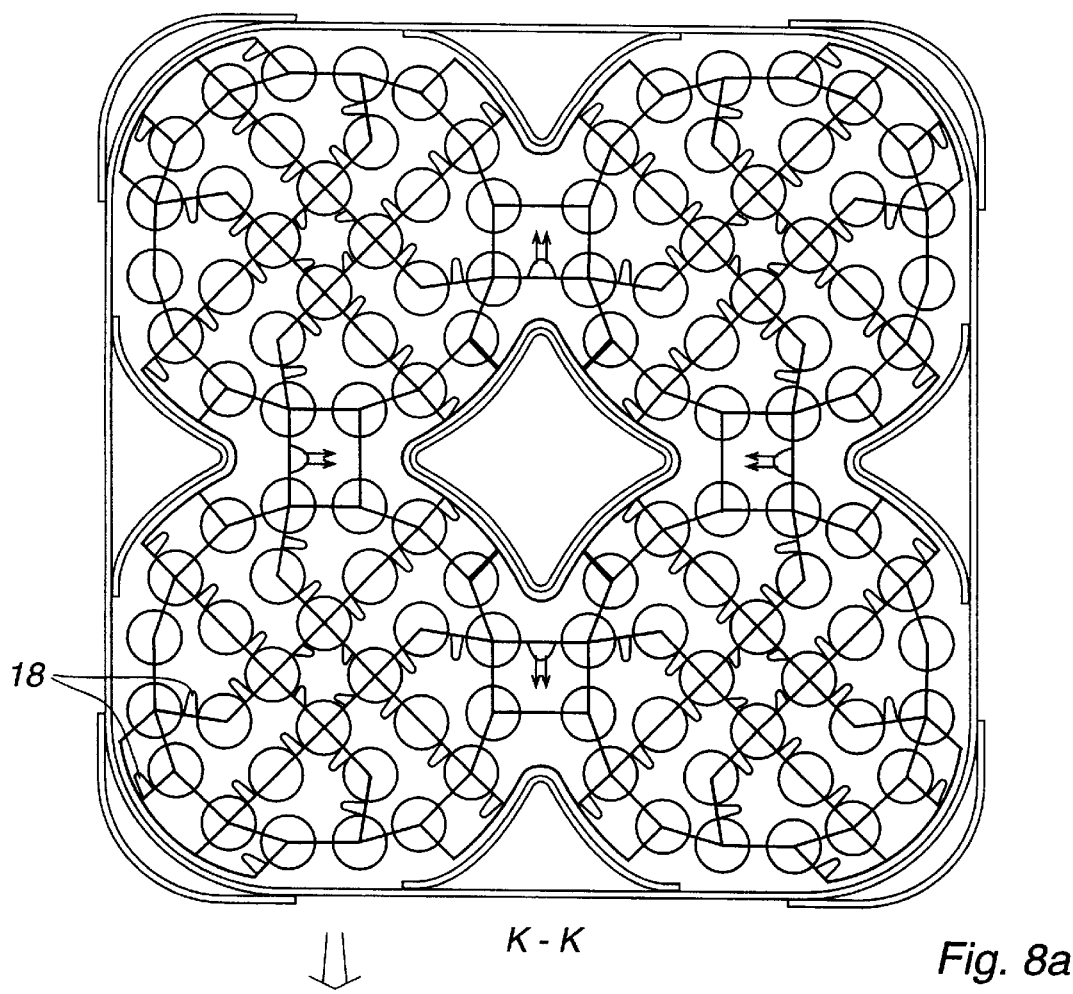
FIG. 8a shows an end plate with rotary vanes.
Figure 8B:
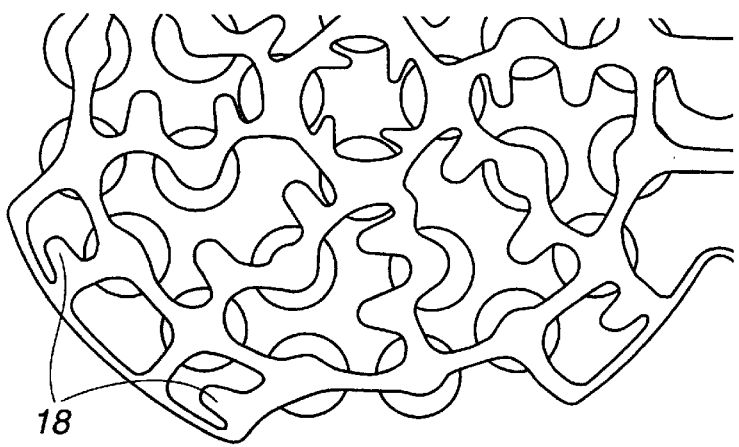
FIG. 8b shows the shape of the end plate in more detail.

The bottom tie plate and the top tie plate are provided with a large number of openings to allow the passage of coolant. To strengthen the eddies around the steam conducting channel, the bottom tie plate and the top tie plate are preferably provided with rotary vanes. FIG. 8a shows an example of a bottom tie plate for a fuel unit 3a in a section K—K through FIG. 1. FIG. 8b shows in more detail the design of part of the bottom tie plate. Rotary vanes 18 are arranged to guide the water and the steam in the direction of the eddy.

FIG. 4a shows an additional embodiment of the invention. In this embodiment, a volume is opened up around the rotary centre in the upper part of the assembly through a transformation of the lattice. The fuel units 3c in the upper part of the fuel assembly have a lattice which differs from the lattice in the fuel units 3a in the lower part of the fuel assembly in that at least certain lattice positions have been displaced outwards from the centre of the rings. This lattice transformation results in the fuel rods in the upper part of the fuel assembly being displaced outwards in a radial direction in relation to the fuel rods in the lower part of the fuel assembly. In the same way as in the preceding example, the upper end of the fuel rods is displaced one or two steps in the lattice in relation to the lower end of the fuel rods. The displacement takes place within the same ring so that the fuel rods are inclined in the tangential direction of the ring.

Figure 4B:
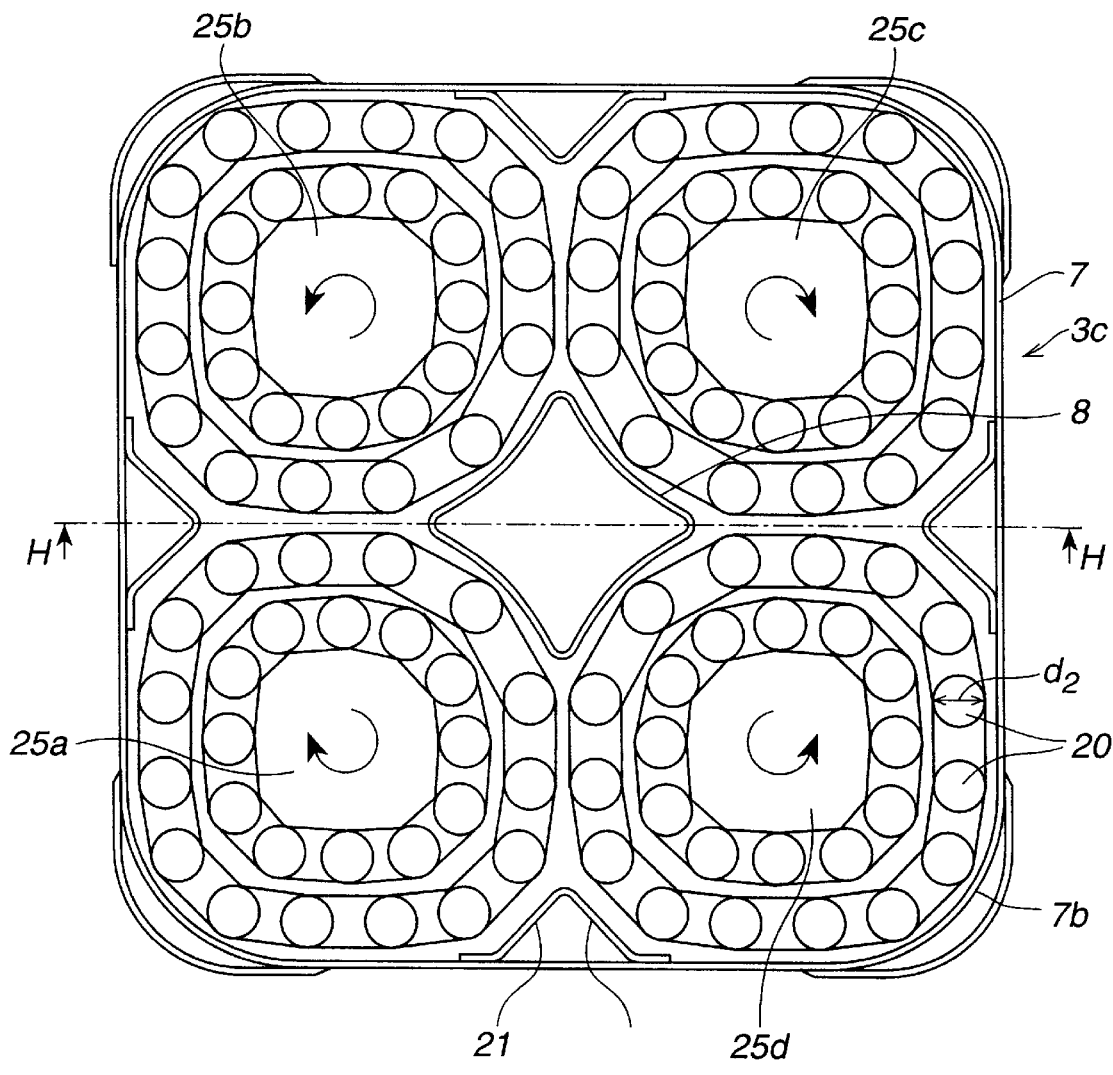

FIG. 2a shows a fuel unit 3a in the lower part of the fuel assembly, which has a first lattice with 28 fuel rod positions in each rotary cell. FIG. 4b shows a fuel unit 3c in the upper part of the fuel assembly, which has a second lattice with 27 fuel rod positions in each rotary cell. The fuel unit 3c has four open volumes 25a, 25b, 25c, 25d in the centre of each rotary cell.

Figure 4D:
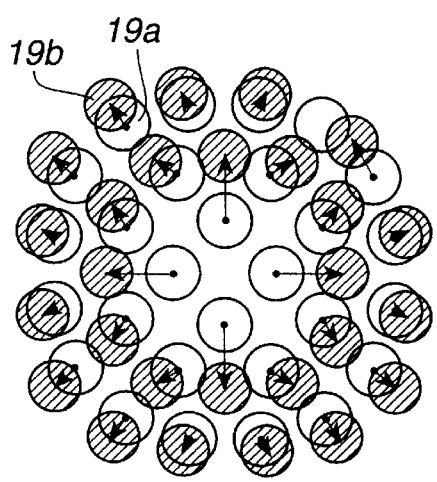
FIG. 4d shows for the fuel assembly in FIG. 4a how the lattice in an upper fuel unit is displaced outwards in relation to the lattice in a lower fuel unit.
Figure 4C:
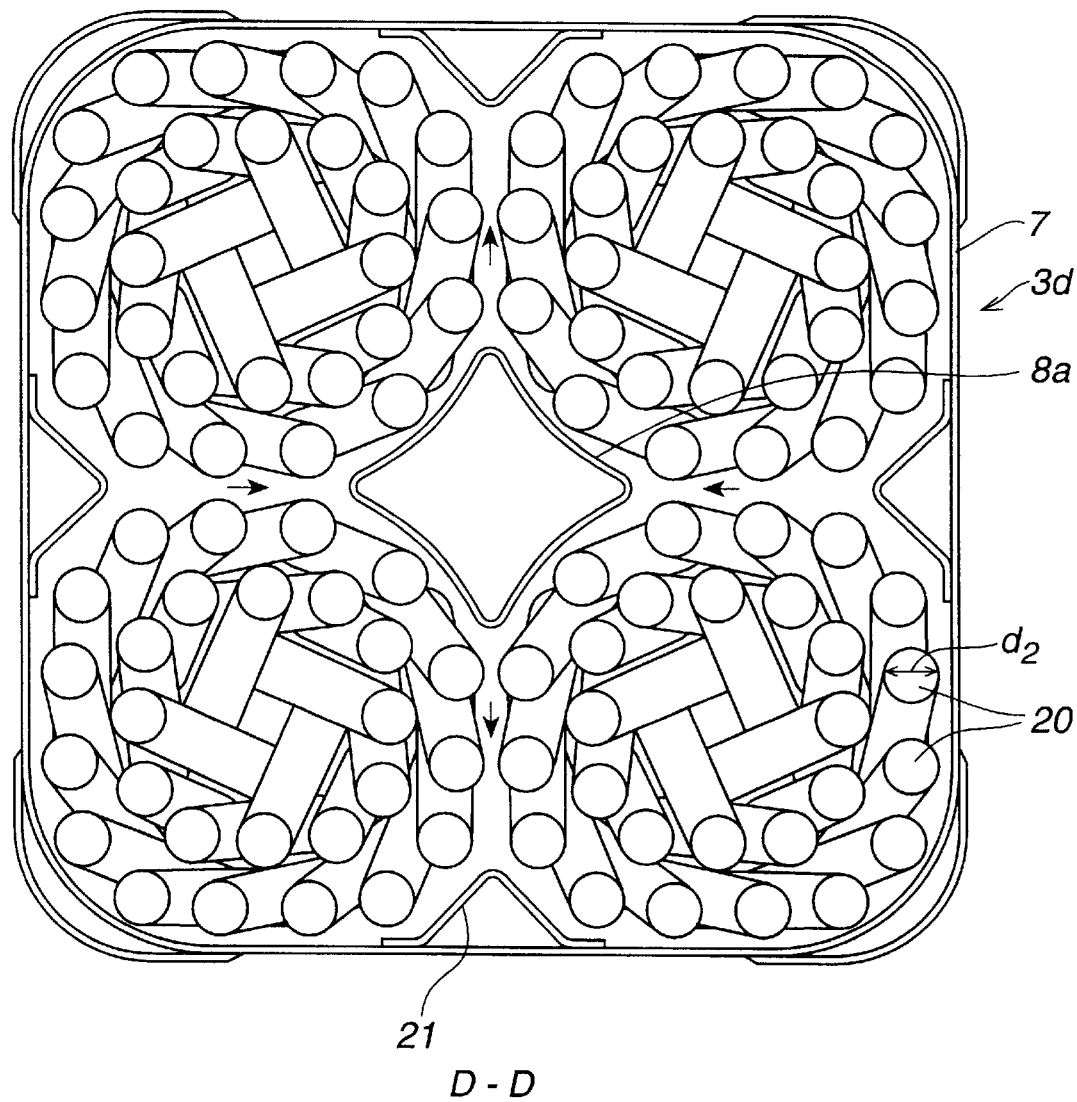

FIG. 4d shows how the lattice positions 19b in the second lattice are displaced in relation to the lattice positions 19a in the first lattice. Between these fuel units there is a third type of fuel unit, a transition unit 3d, which comprises both the first and the second lattice. The bottom tie plate has a lattice which is substantially the same as the lattice in the lower fuel units 3a and the top tie plate has a lattice which is substantially the same as the lattice in the upper fuel units 3c. The fuel rods in the fuel unit 3d are thus inclined outwards in a radial direction. In addition to providing an open volume, also a transport of water along the outwardly inclined fuel rods towards the periphery of the fuel assembly is obtained in this way. The fuel rods in the fuel unit 3d may, in the same way as in the other units, be arranged so as to be inclined in the direction of tangent of the ring. The fuel rods in the fuel unit 3d will then be inclined both radially and tangentially.

One advantage of inclining the fuel rods outwardly instead of omitting central fuel rods is the increased possibility of bringing water towards the peripheral parts of the rotary cell, since the water tends to follow the rods in the form of a film.

Another difference between the fuel units is that the fuel rods 20 in the upper fuel units 3c and the transition unit 3d have a rod diameter $d_2$ which is smaller than the rod diameter $d_1$ of the fuel rods 4 in the lower units 3a. This results in the free flow area being significantly smaller in the lower part of the fuel assembly compared with the upper part thereof. The greatly limited flow area in the lower part gives the water a high flow rate and thus speeds up the rotation even from the beginning. The narrower fuel rods prevent too high a pressure drop in the upper part of the fuel assembly. To further increase the free flow area in the upper part of the fuel assembly, the guide bar 21 has a smaller cross section in the upper part of the fuel assembly than in the lower part thereof.

Figure 6:
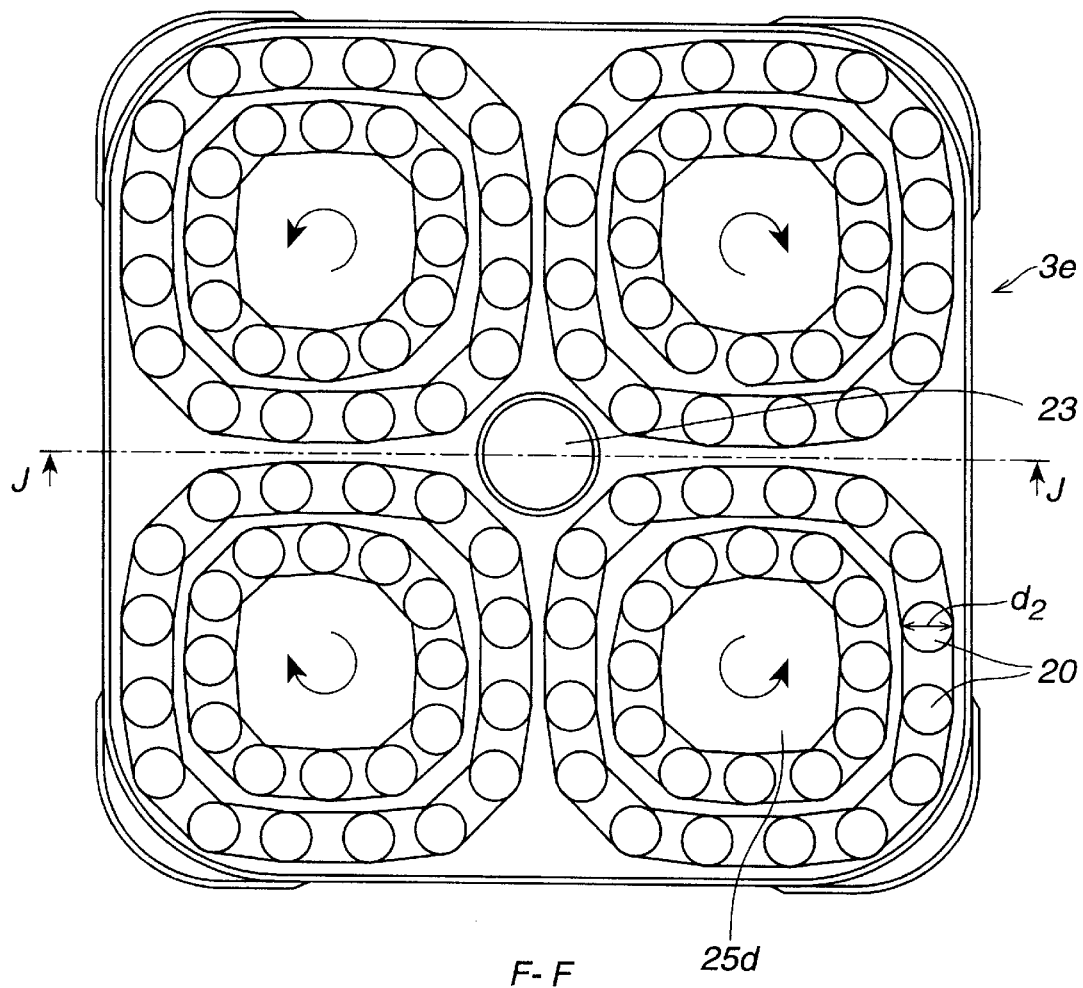
FIG. 6 shows a horizontal section F—F through the fuel assembly in FIG. 5.

FIG. 5 shows a further embodiment of the invention, in which the fuel units 3e in the upper and the fuel units 3a in the lower part of the fuel assembly have different lattices but the same number of fuel rods. FIG. 2a shows the fuel unit 3a in the lower part of the fuel assembly, which has a first lattice with 28 fuel rod positions in each rotary cell. FIG. 6 shows a section through the fuel unit 3e in the upper part of the fuel assembly, which has a second lattice with 28 fuel rod positions in each rotary cell.

FIG. 5a shows how the lattice positions 21b in the second lattice are displaced in relation to the lattice positions 21a in the first lattice. To make room for all the fuel rods in the second lattice, the centre tube 23 has a cross-section area in the upper part of the fuel assembly which is smaller than its cross-section area in the lower part of the fuel assembly. The fuel rods 20 in the upper fuel units 3e have a rod diameter $d_2$ which is smaller than the rod diameter $d_1$ of the fuel rods 4 in the lower units 3a. The fuel assembly may comprise one or more transition units between the upper and lower fuel units. To increase the free flow area in the upper part of the fuel assembly, the guide bar 24 terminates below the upper fuel units.

Figure 9:
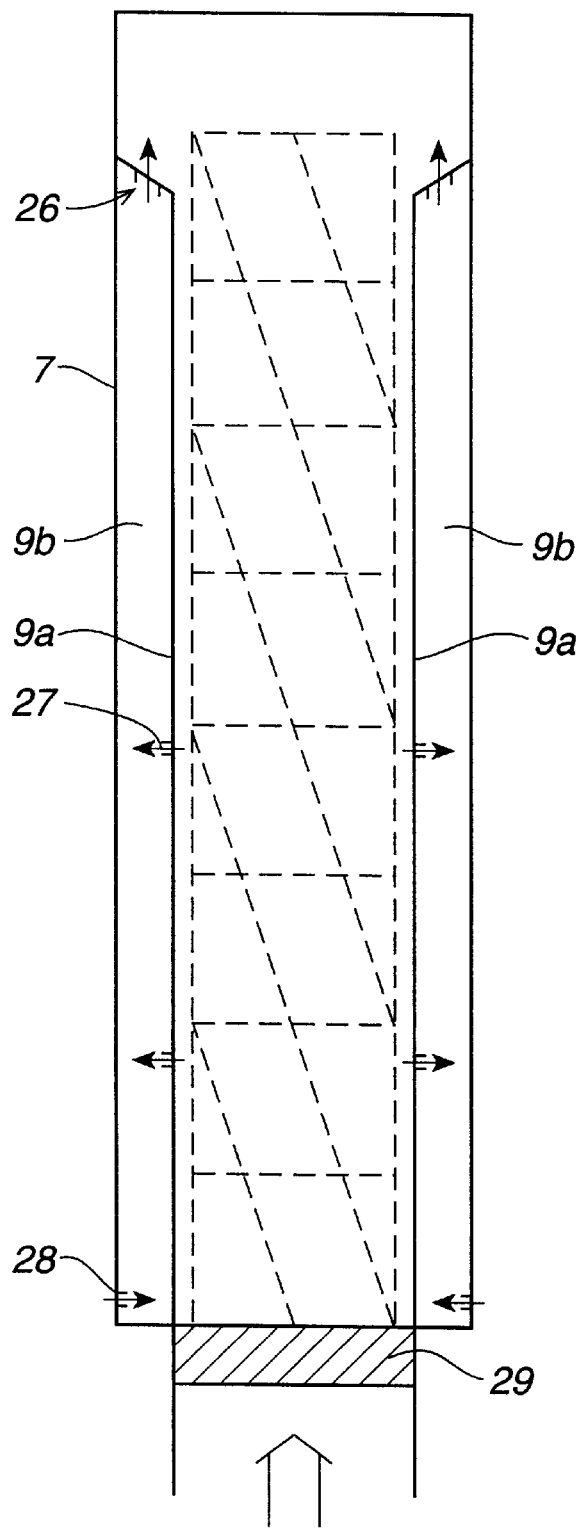
FIG. 9 schematically shows a fuel assembly according to one embodiment of the invention.

FIG. 9 schematically shows a fuel assembly according to the invention, in which the bypass channels 9b are provided with outflow holes 26 in their upper end and with outer inflow holes 28 in the fuel channel and inner inflow holes 27 in the guide bar. The fuel assembly has a bottom support 29 with an inlet opening for each rotary cell. The bottom support may be provided with guide bars or oblique channels.

In these embodiments, the fuel units are retained over the whole cross section of the fuel assembly. Of course, other embodiments may be provided, with partitions which connect the walls of the fuel channel to the centre tube.

What is claimed is:

1. A fuel assembly for a boiling water reactor which is adapted, during operation of the reactor, to allow coolant to flow upwards through the fuel assembly, and wherein the fuel assembly comprises a plurality of fuel rods, each of which having an upper end and a lower end, a steam conducting channel through which steam flows through the fuel assembly, and a fuel channel (7) surrounding the fuel rods, characterized in that the fuel assembly comprises a rotary cell (13a–13d) in which the fuel rods (4, 20) are arranged in a number of concentric rings (15, 16) with a substantially circular shape, and said steam conducting channel (17a–17d) is arranged in the centre of the concentric rings, and that at least certain of the fuel rods in the rings are arranged such that their upper ends are displaced in relation to their lower ends in a tangential direction such that the flowing coolant is brought to rotate around the steam conducting channel.

2. A fuel assembly according to claim 1, characterized in that all the fuel rods in the rotary cell are inclined in the same direction and this direction is either clockwise or anticlockwise around the steam conducting channel.

3. A fuel assembly according to claim 1, characterized in that the fuel assembly comprises a plurality of rotary cells (13a–13d) and that each one of the rotary cells is at least partially surrounded by a flow-guiding structure (8a, 9a, 7b).

4. A fuel assembly according to claim 3, characterized in that at least part of the flow-guiding structure consists of a tubular member (8a) arranged in the central part of the fuel assembly with its longitudinal direction substantially parallel to the longitudinal direction of the fuel assembly.

5. A fuel assembly according to claim 3, characterized in that the flow-guiding structures comprise guide members (10) to mechanically strengthen and contribute to the rotation of coolant around the steam conducting channels.

6. A fuel assembly according to claim 3, characterized in that at least part of the flow-guiding structure consists of an elongated member (9a), the longitudinal direction of which is substantially parallel to the longitudinal direction of the fuel assembly and which is arranged at the fuel channel (7).

7. A fuel assembly according to claim 6, characterized in that said elongated member (9a) and the fuel channel (7) together form a channel (9b) which allows the passage of coolant.

8. A fuel assembly according to claim 1, characterized in that the fuel assembly comprises a plurality of fuel units (3a–3e) stacked on top of each other, each one comprising a top tie plate (5), a bottom tie plate (6), a plurality of fuel rods (4, 20) extending between the top tie plate and the bottom tie plate, and that at least certain of the fuel units (3b–3e) comprise an empty volume which constitutes part of said steam conducting channel (17a–17d, 25a, 25d).

9. A fuel assembly according to claim 8, characterized in that it comprises a fuel unit (3d) in which at least certain of the fuel rods are arranged such that the first end is displaced in a radial direction outwards from the centre of the ring in relation to the lower end.

10. A fuel assembly according to claim 8, characterized in that at least some fuel unit (3a–3e) has reduced corner portions (7b, 7c) and that the corner portions are provided with corner bars (12).

11. A fuel assembly according to claim 8, characterized in that it comprises a lower fuel unit (3a) with a first lattice and an upper fuel unit (3c, 3e) with a second lattice which differs from the first lattice in that at least some of the positions in the lattice have been displaced outwards in a radial direction.

12. A fuel assembly according to claim 11, characterized in that the majority of the fuel rods (20) in the upper fuel unit (3c, 3e) have a diameter ($d_1$) which is smaller than the diameter ($d_2$) of the majority of the fuel rods (4) in the lower fuel unit (3a).

* * * * *